(12) United States Patent
Jeon

(10) Patent No.: US 10,216,244 B2
(45) Date of Patent: Feb. 26, 2019

(54) ELECTRONIC DEVICE AND METHOD FOR CONTROLLING THE SAME

(71) Applicant: Samsung Electronics Co., Ltd., Gyeonggi-do (KR)

(72) Inventor: Jin-Young Jeon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 219 days.

(21) Appl. No.: 15/257,413

(22) Filed: Sep. 6, 2016

(65) Prior Publication Data
US 2017/0269671 A1    Sep. 21, 2017

(30) Foreign Application Priority Data

Mar. 21, 2016  (KR) ........................ 10-2016-0033485

(51) Int. Cl.
| G06F 1/32 | (2006.01) |
| G06F 1/3218 | (2019.01) |
| G06F 1/3231 | (2019.01) |
| G06F 1/3234 | (2019.01) |
| G06F 1/3287 | (2019.01) |
| G06F 9/4401 | (2018.01) |

(52) U.S. Cl.
CPC .......... *G06F 1/3218* (2013.01); *G06F 1/3231* (2013.01); *G06F 1/3265* (2013.01); *G06F 1/3287* (2013.01); *G06F 9/4418* (2013.01)

(58) Field of Classification Search
CPC .... G06F 1/3218; G06F 1/3231; G06F 1/3265; G06F 1/3287; G06F 9/4418
See application file for complete search history.

(56) References Cited

U.S. PATENT DOCUMENTS

| 5,724,063 | A | * | 3/1998 | Chee .................... G09G 3/3611 345/103 |
| 10,095,594 | B2 | * | 10/2018 | Vanderah ............ G06F 11/2041 |
| 10,096,295 | B2 | * | 10/2018 | Nagao .................. G09G 3/3696 |
| 2015/0221262 | A1 | | 8/2015 | Hwang et al. |
| 2015/0277545 | A1 | * | 10/2015 | Flowers ................ G06F 1/3296 713/323 |

FOREIGN PATENT DOCUMENTS

KR    100930961    12/2009

* cited by examiner

*Primary Examiner* — Sejoon Ahn
(74) *Attorney, Agent, or Firm* — The Farrell Law Firm, P.C.

(57) ABSTRACT

Disclosed is an electronic device that may perform a procedure for activating a display simultaneously with a procedure for activating other components of the electronic device among procedures for driving the display, allowing for quick activation of the display after the display is released from the power saving mode. Methods utilizing the electronic device are also disclosed.

16 Claims, 10 Drawing Sheets

ELECTRONIC DEVICE AND METHOD FOR CONTROLLING THE SAME

PRIORITY

This application claims priority under 35 U.S.C. § 119(a) to a Korean Patent Application filed in the Korean Intellectual Property Office on Mar. 21, 2016 and assigned Serial No. 10-2016-0033485, the contents of which are incorporated herein by reference.

BACKGROUND

1. Field of the Disclosure

The present disclosure relates generally to electronic devices and methods for controlling the same, and more particularly, to methods for displaying images through the displays of the electronic devices.

2. Description of the Related Art

Technology has been disclosed for providing a display power saving mode through an electronic device including a display.

For example, when no entry to an electronic device is acknowledged including when the electronic device is not in use, the electronic device may run a power saving mode for the display, thereby allowing the electronic device to reduce power consumption.

In such a conventional power saving mode, when the user does enter into the electronic device intending to awaken the electronic device, the electronic device activates the display after performing a series of procedures to drive the display.

As described above, upon using a power saving-applied electronic device, much time is consumed for the user to turn on the display and display screen by performing an input into the electronic device.

As such, there is a need in the art for a method and apparatus that reduces the time consumed in such display manipulation of an electronic device.

SUMMARY

The present disclosure has been made to address the above-mentioned problems and disadvantages, and to provide at least the advantages described below.

Accordingly, an aspect of the present disclosure is to provide an electronic device that may perform a procedure for activating the display simultaneously with a procedure for activating the other components of the electronic device among procedures for driving the display, allowing for quick activation of the display after the display is released from the power saving mode.

According to an aspect of the present disclosure, an electronic device includes a housing, a connecting structure connected with a first portion of the housing and configured to be detachably connected with a portion of a user's body, a display exposed through a second portion of the housing, a display driver integrated circuit (IC) positioned inside the housing and electrically connected with the display, a power source, a user space integrated into or separated from the display, at least one sensor, a processor positioned inside the housing and electrically connected with the display, the display driver IC, the power source, the user space, or the at least one sensor, and a memory positioned inside the housing, electrically connected with the processor, and storing an operating system including a kernel and instructions that when executed, enable the processor to identify a variation using the user space or the at least one sensor while the display is off, activate the kernel without activating other components of the electronic device in response to the variation, determine whether the display needs to be activated, after determining that the display does not need be activated, activate the display driver IC, after activating the display driver IC, activate at least some of the other components of the electronic device, after activating the at least some of the other components, receive data to be displayed on the display, after receiving the data, determine whether the display is in an activation mode for displaying an image based on the data, and after determining that the display is in the activation mode for displaying the image, provide the data to the display driver IC.

According to another aspect of the present disclosure, a method for controlling an electronic device includes identifying a variation while a display of the electronic device is off, activating a kernel without activating other components of the electronic device in response to the variation, determining whether the display needs to be activated, activating, after determining that the display need not be activated, a display driver integrated circuit (IC) electrically connected with the display, activating, after activating the display driver IC, at least some of the other components of the electronic device, receiving, after activating the at least some of the other components, data to be displayed on the display, determining, after receiving the data, whether the display is in an activation mode for displaying an image based on the data, and providing the data to the display driver IC, after determining that the display is in the activation mode for displaying the image.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EMBODIMENTS OF THE DISCLOSURE

Figure 1:
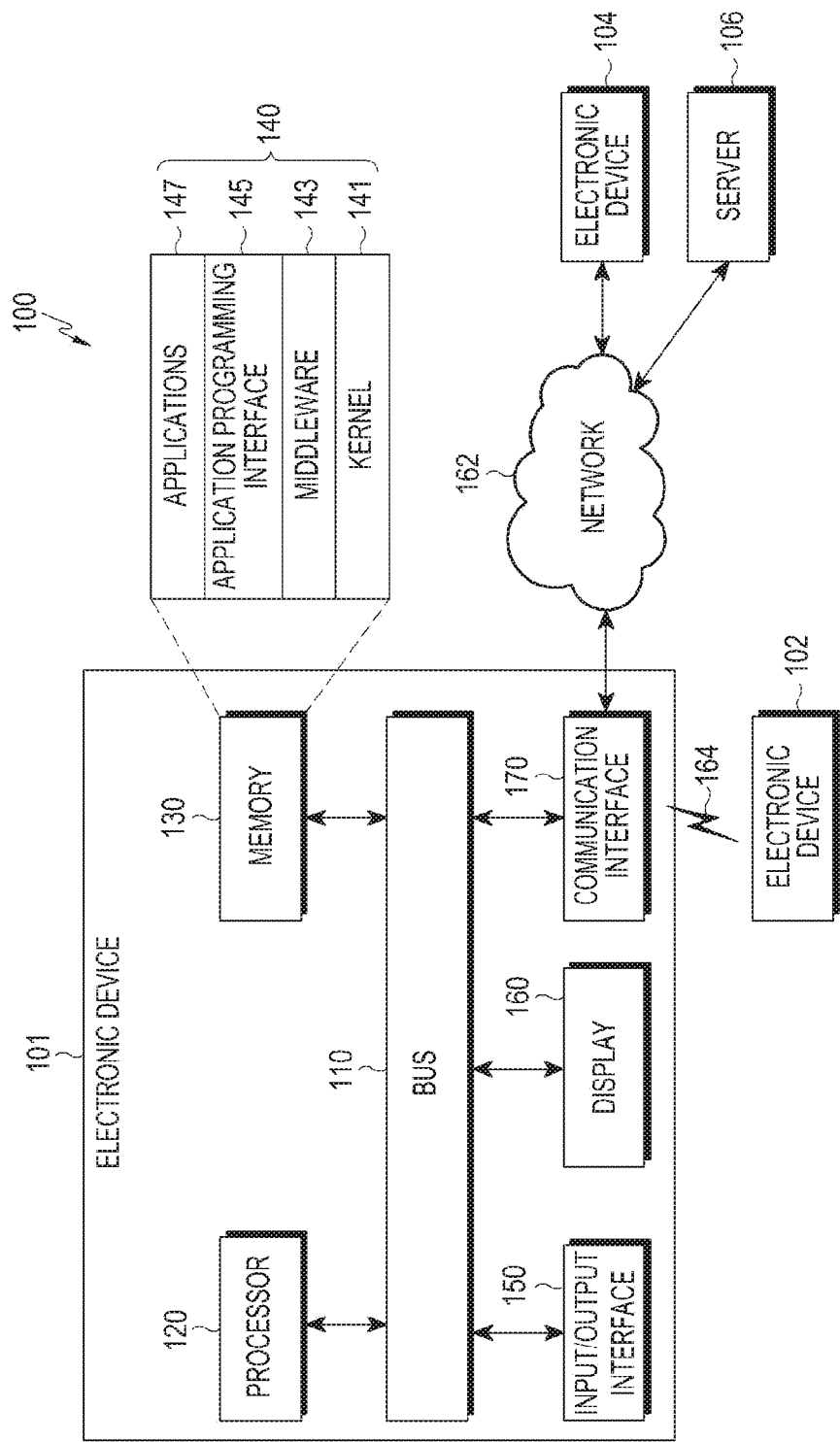
FIG. 1 illustrates an electronic device and a network according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element, such as a first element, is referred to as being operatively or communicatively "coupled with/to," or "connected with/to" another element, such as a second element, the first element can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor, such as a central processing unit (CPU) or application processor that may perform the operations by executing one or more software programs stored in a memory device or a dedicated processor, such as an embedded processor for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), a motion picture experts group (MPEG) layer audio 3(MP3) player, a mobile medical device, a camera, or a wearable device. The wearable device may include at least one of an accessory-type device, such as a watch, a ring, a bracelet, an anklet, a necklace, glasses, contact lenses, or a head-mounted device (HMD), a fabric- or clothes-integrated device, such as electronic clothes, a body attaching-type device, such as a skin pad or tattoo, or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box, such as Samsung HomeSync™, Apple TV™, or Google TV™, a gaming console (Xbox™, PlayStation™), an electronic dictionary, an electronic key, a camcorder, or an electronic picture frame.

According to an embodiment of the present disclosure, examples of the electronic device may include at least one of various medical devices, such as diverse portable medical measuring devices including a blood sugar measuring device, a heartbeat measuring device, or a body temperature measuring device, a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device, such as a sailing navigation device or a gyro compass, avionics, security devices, vehicular head units, industrial or home robots, drones, an automated teller machine (ATM), point of sales (POS) device, or Internet of Things (IoT) devices, such as a light bulb, various sensors, a sprinkler, a fire alarm, a thermostat, a street light, a toaster, fitness equipment, a hot water tank, a heater, or a boiler.

According to embodiments of the disclosure, examples of the electronic device may at least one of part of a piece of furniture, building/structure or vehicle, an electronic board, an electronic signature receiving device, a projector, or various measurement devices, such as devices for measuring water, electricity, gas, or electromagnetic waves. The electronic device may be flexible or may be a combination of the above-enumerated electronic devices. The electronic device is not limited to the above-listed embodiments. As used herein, the term "user" may denote a human or another device, such as an artificial intelligence electronic device using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications, such as control messages or data between the components. The processing module 120 may include one or more of a CPU, an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources, such as the bus 110, processor 120, or a memory 130, used to perform operations or functions implemented in other programs, such as the middleware 143, API 145, or applications 147. The kernel 141 may provide an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141, for example. Further, the middleware 143 may process one or more task requests received from the applications 147 in order of priority. For example, the middleware 143 may assign a priority of using system resources of the electronic device 101 to at least one of the applications 147 and process one or more task requests. The API 145 allows the applications 147 to control functions provided from the kernel 141 or the middleware 143. For example, the API 133 may include at least one interface or function for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display various contents, such as text, images, videos, icons, or symbols, to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device, such as a first electronic device 102, a second electronic device 104, or a server 106. For example, the communication interface 170 may be connected with the network 162 through wireless communication 164 or wired communication to communicate with the external electronic device, such as the second external electronic device 104 or server 106.

The wireless communication may include cellular communication using at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). According to an embodiment of the present disclosure, the wireless communication may include at least one of, e.g., wireless fidelity (Wi-Fi), Bluetooth™, Bluetooth low energy (BLE), Zigbee™, near field communication (NFC), magnetic secure transmission (MST), radio frequency, or body area network (BAN). The wireless communication may include global navigation satellite system (GNSS) such as global positioning system (GPS), global navigation satellite system (Glonass), Beidou navigation satellite system (Beidou) or Galileo, or the European global satellite-based navigation system. Hereinafter, the terms "GPS" and "GNSS" may be interchangeably used. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network, such as local area network (LAN) or wide area network (WAN), the Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices. When the electronic device 101 should perform some function or service automatically or at a request, the electronic device 101, instead of executing the function or service on its own or additionally, may request another device to perform at least some functions associated therewith. The other electronic device may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
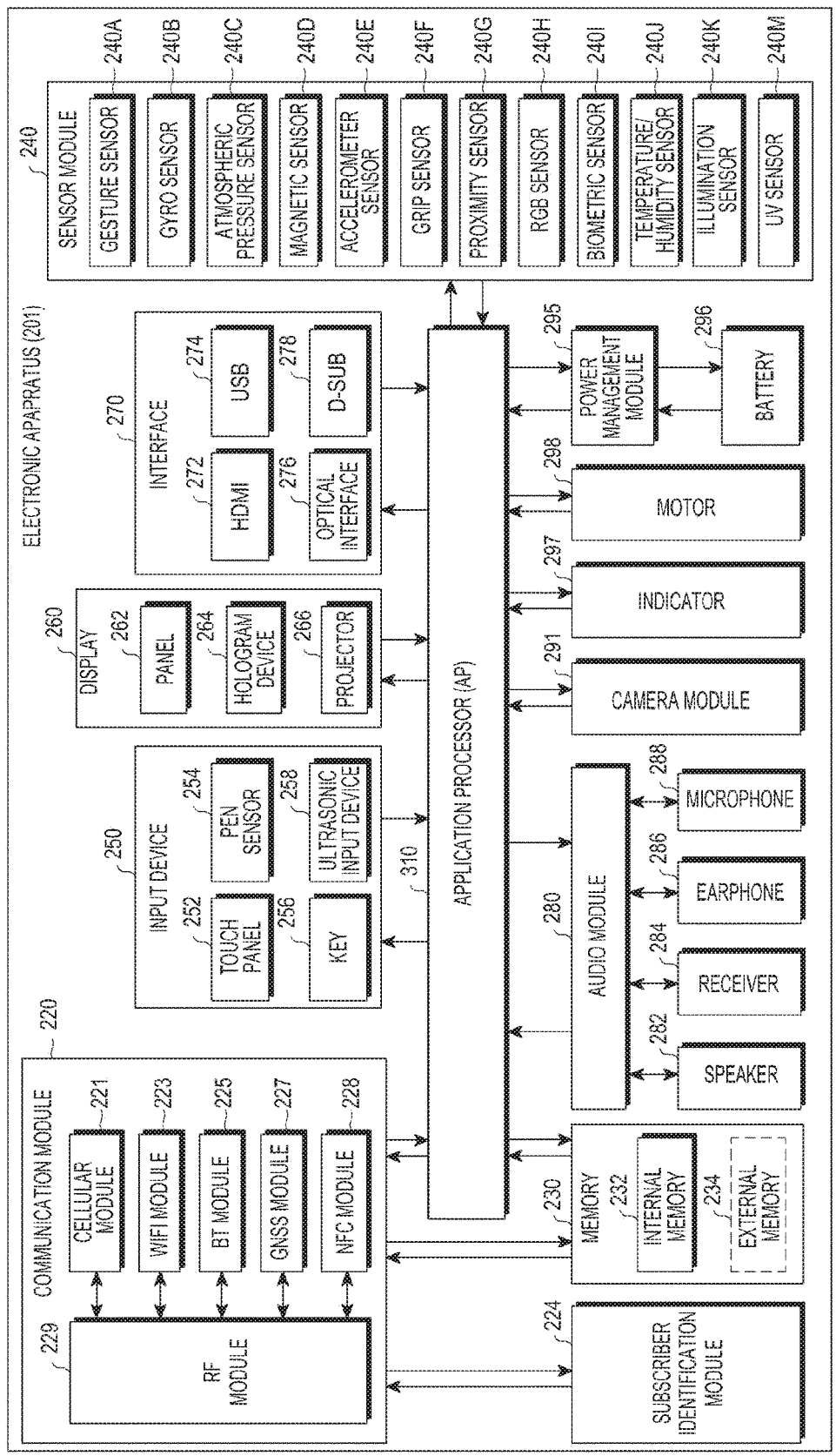
FIG. 2 illustrates an electronic device according to an embodiment of the present disclosure.

FIG. 2 illustrates an electronic device 201 according to an embodiment of the present disclosure. The electronic device 201 may include all or part of the configuration of, e.g., the electronic device 101 shown in FIG. 1. The electronic device 201 may include one or more processors, such as application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). The processor 210 may further include a graphic processing unit (GPU) and/or an image signal processor. The processor 210 may include at least some of the components shown in FIG. 2. The processor 210 may load a command or data received from at least one of other components, such as a non-volatile memory on a volatile memory, process the command or data, and store resultant data in the non-volatile memory.

The communication module 220 may have the same or similar configuration to the communication interface, such as the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a radio frequency (RF) module 229. The cellular module 221 may provide voice call, video call, text, or Internet services through, e.g., a communication network. The cellular module 221 may perform identification or authentication on the electronic device 201 in the communication network using a subscriber identification module (SIM) card 224. The cellular module 221 may perform at least some of the functions provideable by the processor 210.

According to an embodiment of the present disclosure, the cellular module 221 may include a communication processor (CP). At least some, such as two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals, such as RF signals. The RF module 229 may include, e.g., a transceiver, a power amplifier module (PAM), a frequency filter, a low noise amplifier (LNA), or an antenna. At least one of the cellular module 221, the Wi-Fi module 223, the Bluetooth module 225, the GNSS module 227, or the NFC module 228 may communicate RF signals through a separate RF module. The SIM card 224 may include, e.g., a card including a subscriber identification module or an embedded SIM, and may contain unique identification information, such as an integrated circuit card identifier (ICCID) or subscriber information, such as an international mobile subscriber identity (IMSI).

The memory 230 may include, e.g., an internal memory 232 or an external memory 234. The internal memory 232 may include at least one of, e.g., a volatile memory, such as a dynamic RAM (DRAM), a static RAM (SRAM), and a synchronous dynamic RAM (SDRAM), or a non-volatile memory, such as a one-time programmable ROM (OTPROM), a programmable ROM (PROM), an erasable and programmable ROM (EPROM), an electrically erasable and programmable ROM (EEPROM), a mask ROM, a flash ROM, a flash memory, such as a NAND or a NOR flash, a hard drive, or a solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone 288 to identify data corresponding to the sensed ultrasonic wave.

The display 260 may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or the microphone 288. For example, the camera module 291 may capture still images and videos, and may include, according to an embodiment of the present disclosure, one or more image sensors, such as front and back sensors, a lens, an image signal processor (ISP), or a flash such as an LED or xenon lamp. The power manager module 295 may manage power of the electronic device 201, for example. According to an embodiment of the present disclosure, the power manager module 295 may include a power management integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part of the electronic device, including e.g., a booting state, a message state, or recharging state. The motor 298 may convert an electric signal to a mechanical vibration and may generate a vibrational or haptic effect. The electronic device 201 may include a mobile TV supporting device, such as a graphics processing unit (GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to embodiments, the electronic device 201 may exclude some elements or include more elements, or some of the elements may be combined into a single entity that may perform the same function as by the elements before combined.

Figure 3:
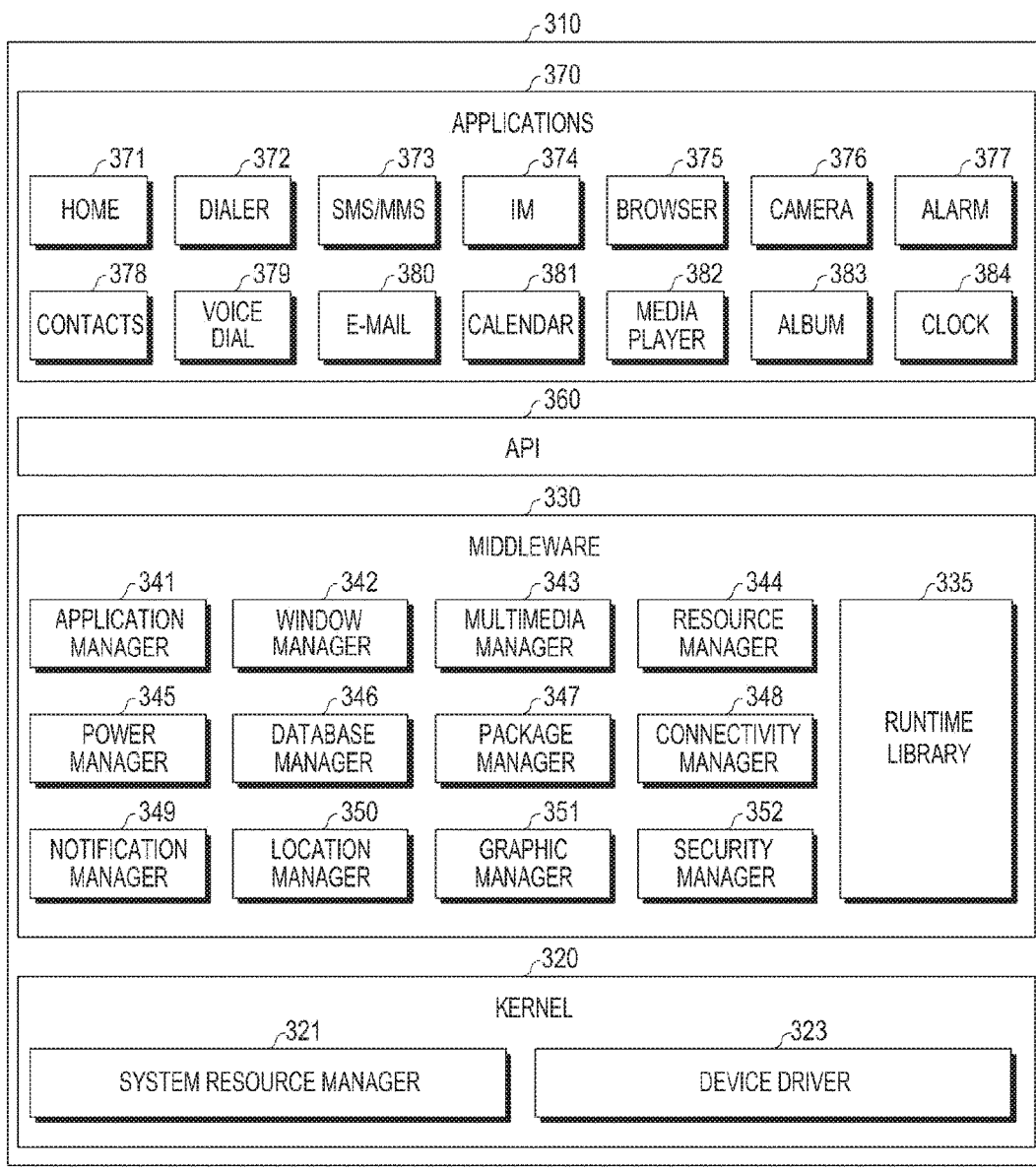
FIG. 3 illustrates a program module according to an embodiment of the present disclosure.

FIG. 3 illustrates a program module according to an embodiment of the present disclosure. The program module 310 may include an operating system (OS) controlling resources related to the electronic device and/or various applications driven on the operating system. The operating system may include, e.g., Android™, iOS™, Windows™, Symbian™, Tizen™, or Bada™. Referring to FIG. 3, the program module 310 may include a kernel 320, middleware 330, an API 360, and/or applications 370. At least a part of the program module 310 may be preloaded on the electronic device or may be downloaded from an external electronic device.

The kernel 320 may include, e.g., a system resource manager 321 or a device driver 323. The system resource manager 321 may perform control, allocation, or recovery of system resources, and may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while the application 370 is being executed. The runtime library 335 may perform input/output management, memory management, or arithmetic function processing. The application manager 341 may manage the life cycle of the applications 370. The window manager 342 may manage GUI resources used on the screen. The multimedia manager 343 may procure formats necessary to play media files and use a codec appropriate for a format to perform encoding or decoding on media files. The resource manager 344 may manage the source code or memory space of the application 370. The power manager 345 may manage, the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage wireless connectivity. The notification manager 349 may provide an event, e.g., arrival message, appointment, or proximity alert, to the user. The location manager 350 may manage locational information on the electronic device. The graphic manager 351 may manage graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements, and may provide a module specified according to the type of the operating system. The middleware 330 may dynamically omit some existing components or add new components. The API 360 may be a set of API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, a short message service/multimedia messaging service (SMS/MMS) 373, an instant message (IM) 374, a browser 375, a camera 376, an alarm 377, a contact 378, a voice dial 379, an email 380, a calendar 381, a media player 382, an album 383, or a clock 384, a health-care, such as measuring the degree of workout or blood sugar, or provision of environmental information, such as provision of air pressure, moisture, or temperature information.

According to an embodiment of the present disclosure, the applications 370 may include an information exchanging application supporting information exchange between the electronic device and an external electronic device. Examples of the information exchange application may include, but are not limited to, a notification relay application for transferring specific information to the external electronic device, or a device management application for managing the external electronic device.

For example, the notification relay application may transfer notification information generated by other application of the electronic device to the external electronic device or receive notification information from the external electronic device and provide the received notification information to the user. The device management application may install, delete, or update a function, such as turn-on/turn-off the external electronic device or some elements, or adjusting the brightness (or resolution) of the display of the external electronic device communicating with the electronic device or an application operating on the external electronic device.

According to an embodiment of the present disclosure, the applications 370 may include a health-care application of a mobile medical device designated according to an attribute of the external electronic device. The applications 370 may include an application received from the external electronic device. At least a portion of the program module 310 may be implemented in software, firmware, hardware (e.g., the processor 210), or a combination of at least two thereof and may include a module, program, routine, command set, or process for performing one or more functions.

As used herein, the term "module" includes a unit configured in hardware, software, or firmware and may be interchangeably used with another element, such as a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device or method may be implemented as instructions stored in a computer-readable storage medium, e.g., in the form of a program module. The instructions, when executed by a processor, may enable the processor to perform a corresponding function. The computer-readable medium may include, e.g., a hard disk, a floppy disc, a magnetic medium, such as magnetic tape, an optical recording medium, such as CD-ROM, DVD, magnetic-optical medium, such as a floptical disk, or an embedded memory. The instruction may include a code created by a compiler or a code executable by an interpreter. Modules or programming modules in accordance with embodiments of the present disclosure may include at least one or more of the aforementioned components, omit some of them, or further include other additional components. Operations performed by modules, programming modules or other components in accordance with embodiments of the present disclosure may be performed sequentially, in parallel, repeatedly or heuristically, or at least some operations may be executed in a different order or omitted or other operations may be added.

As used herein, the term "activate" may be interchangeably used with "turn on," "get ready," "wake up," or "drive."

Figure 4:
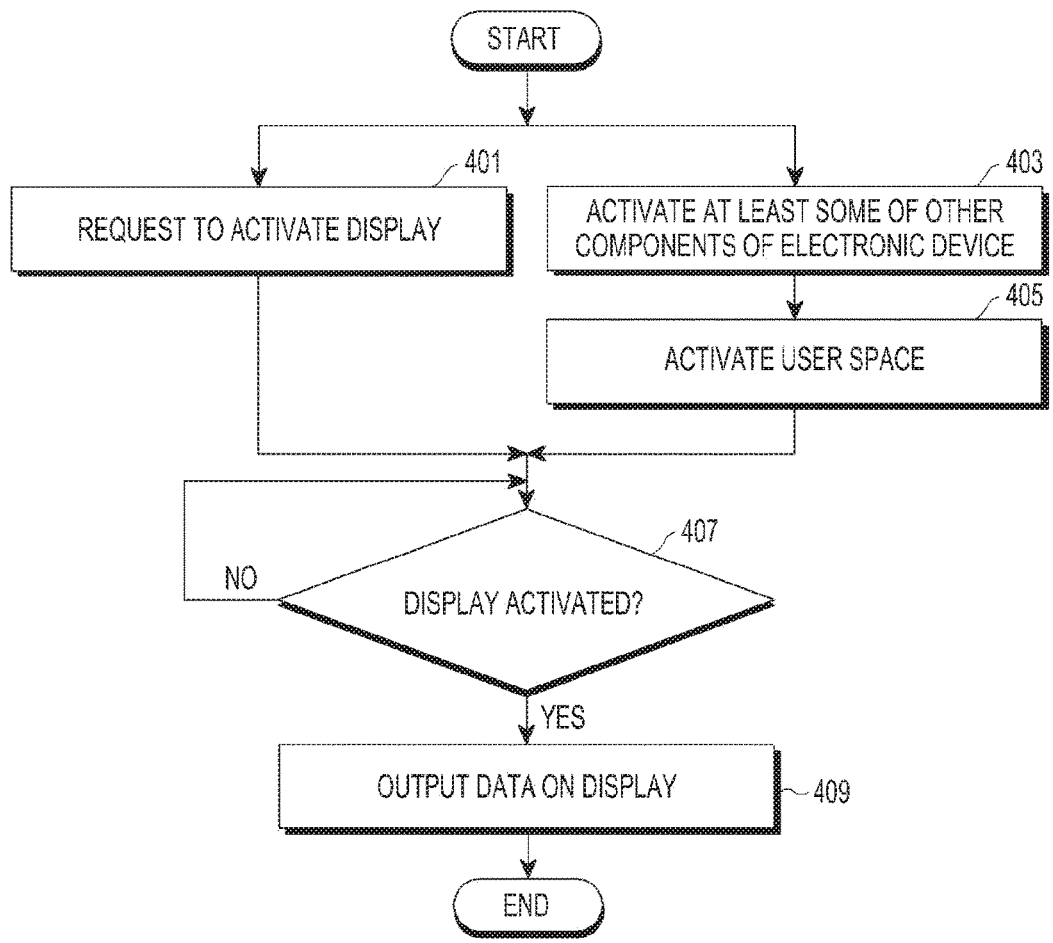
FIG. 4 illustrates a method for providing an image according to an embodiment of the present disclosure.

FIG. 4 illustrates a method for providing an image according to an embodiment of the present disclosure.

Referring to FIG. 4, according to an embodiment of the present disclosure, the processor 120 may check a standby state (also referred to as a suspended mode) of the system.

For example, the suspended mode of the system may include a system power saving mode (e.g., a sleep mode), a state in which no power is applied to the system, a power-off state (e.g., an off mode) of the system, or an inactivated state (e.g., a non-activated mode) of the system.

For example, the system may be an SoC, and components of the electronic device 101 may be at least some of a video driver, camera, touch sensor, or memory in the SoC.

Upon determining that the system is in the suspended mode and is required to be activated, the processor 120 may activate the system.

For example, activating the system may include a power saving release procedure for the system, a procedure for turning on the system, or a procedure for activating the system.

In step 401, the processor 120 may send a request for activating the display 160 to a display driver integrated circuit (IC) before activating other components of the electronic device 101.

The processor 120 may determine whether the display driver IC is activated after sending the activation request prior to activating the other components of the electronic device 101 to the display driver IC.

In step 403, the processor 120 may activate at least some of the other components of the electronic device 101 than the display 160 simultaneously with step 401.

For example, the processor 120 may send a request for activating an input device 250, which is a component of the electronic device 101 other than the display, simultaneously with sending the activation request before activating the other components of the electronic device to the display driver IC.

For example, the other components of the electronic device than the display may include at least some of the input device 250, a communication module, a wireless fidelity (Wi-Fi) module, a Bluetooth module, an audio module, and a sensor module.

In step 405, the processor 120 may send a request for activating a user space.

For example, the user space may mean a storage space for running a user application stored in the memory 150.

In step 407, the processor 120 may determine that the display driver IC is in the activation mode and may determine whether the display 160 is in an activation mode for displaying images based on data while the user space is being activated.

For example, the processor 120 may identify a display power management state (DPMS) of the display while simultaneously identifying that the display driver IC is in the activation mode.

In step 409, upon determining that the display 160 is in the activation mode for displaying images based on data, the processor 120 may control the display driver IC to output data to be displayed on the display 160. Upon determining that the display 160 is not in the activation mode for displaying images based on data, step 407 is repeated.

In the above embodiment, the processor 120 may control the display driver IC to quickly run a procedure for activating the display driver IC which physically takes long, and the electronic device 101 may save unnecessary current consumption, and the display 160 may rapidly display a first frame screen simultaneously with other components without image distortion.

Figure 5:
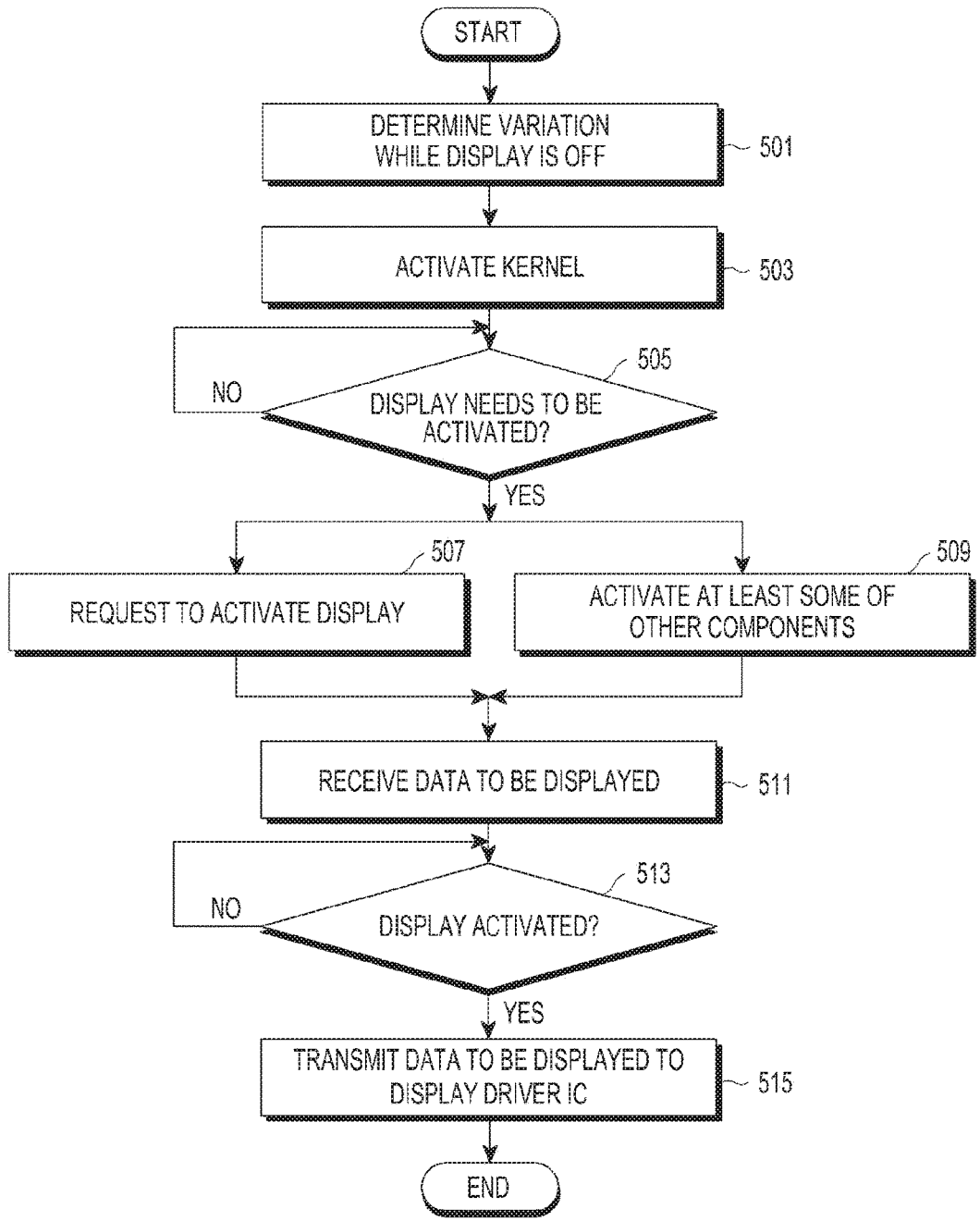
FIG. 5 illustrates a method for providing an image according to an embodiment of the present disclosure.

FIG. 5 illustrates a method for controlling an electronic device according to an embodiment of the present disclosure.

Referring to FIG. 5, in step 501, the processor 120 of the electronic device 101 may determine a variation in the electronic device 101 while the display 160 of the electronic device 101 is off.

In step 503, in response to the determined variation, the processor 120 may activate the kernel 141 included in the memory 130 of the electronic device 101 without a component other than the display 160 of the electronic device 101, or at least one of applications 147 for driving the other component.

For example, the kernel 141 may control or manage system resources, such as the bus 110, processor 120, or a memory 130 used to run operations or functions implemented in other programs or applications 147. As described above in connection with FIG. 1, the kernel 141 may provide an interface that allows the middleware 143, the API 145, or the applications 147 to access the individual components of the electronic device 101 to control or manage the system resources.

In step 505, the processor 120 may determine whether it is in such a situation where the display 160 needs to be activated.

Examples of the situation where the display 160 needs to be activated may include the occurrence of an identifying operation by at least one sensor in the electronic device 101, the occurrence of an operation of receiving an input by at least one input device, and the action of rotating a wrist watch type electronic device.

In step 507, the processor 120 may send a request for activating the display 160 to the display driver IC connecting with the display 160 to activate the display 160.

For example, the display driver IC may be electrically connected with the display 160 to activate the display 160, control the lock mode of the display 160, or control the display 160 to output particular data or frame.

After step 505 and simultaneously with step 507, the processor 120 may activate at least some of other components of the electronic device 101 than the display 160 in step 509.

For example, the processor 120 may determine whether to activate the display 160 corresponding to the identified variation, and upon determining that the display 160 needs to be activated, the processor 120 may activate the display driver IC simultaneously with other components of the electronic device than the display 160, thereby further quickening the activation of the display 160 than in the conventional art.

In step 511, the processor 120 may receive data, such as a first frame to be displayed on the display 160.

For example, the first frame may be a standby screen previously set to be first displayed after the display 160 has been controlled from the lock mode to the activation mode.

In step 513, the processor 120 may determine that the display driver IC is in the activation mode and may determine whether the display 160 is in an activation mode for displaying images based on data while the user space is being activated.

For example, after the request for activating the display driver IC in step 507 which is performed simultaneously with step 509, the processor 120 may determine whether the display driver IC is activated. For example, when the display driver IC is activated, the display driver IC may control the display 160 to display images or frames based on particular data through the display 160.

In step 515, upon determining that the display 160 is in the activation mode for displaying images based on data, the processor 120 may transmit data to be displayed on the display 160 to the display driver IC. Upon determining that the display 160 is not in the activation mode for displaying images based on data, step 513 is repeated.

For example, when the data is provided from the processor 120 to the display driver IC, the display driver IC may control the display 160 to display the received data through the display 160.

Figure 6:
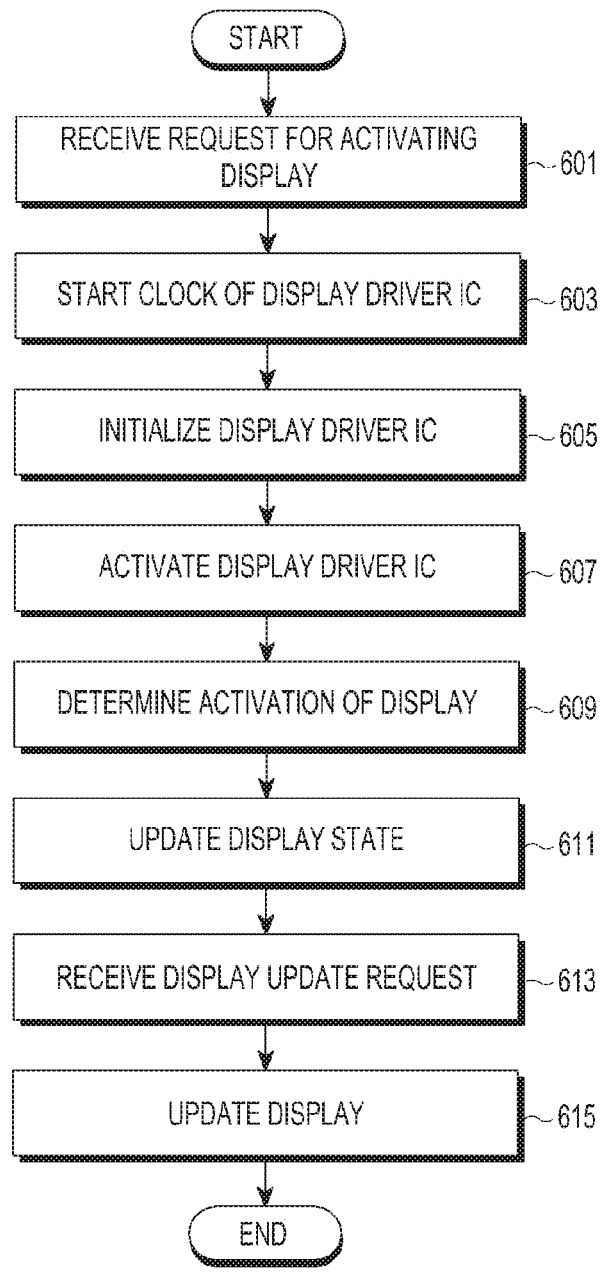
FIG. 6 illustrates a method for controlling an electronic device according to an embodiment of the present disclosure.

FIG. 6 illustrates a method for providing an image according to an embodiment of the present disclosure.

Referring to FIG. 6, in step 601, the display driver IC may receive a request for activating the display driver IC from the processor.

In step 603, the display driver IC may initiate a clock.

In step 605, the display driver IC may initialize itself.

For example, an operation for initializing (also referred to as resetting) the display driver IC may be one of procedures for activating the display driver IC.

In step 607, the display driver IC may activate itself.

In step 609, the display driver IC may determine whether the display is activated.

In step 611, the display driver IC may update the state of the display 160.

For example, the state of the display 160 may include a display power management state (DPMS) of the display 160, the display driver IC may update the DPMS of the display 160, and the display driver IC may update a flag managing the DPMS in order to update the DPMS of the display 160.

In step 613, the display driver IC may receive, from the processor 120, data to be displayed on the display 160 and/or a request for updating the data to be displayed on the display 160.

In step 615, the display driver IC may update the data to be displayed on the display 160.

Figure 7:
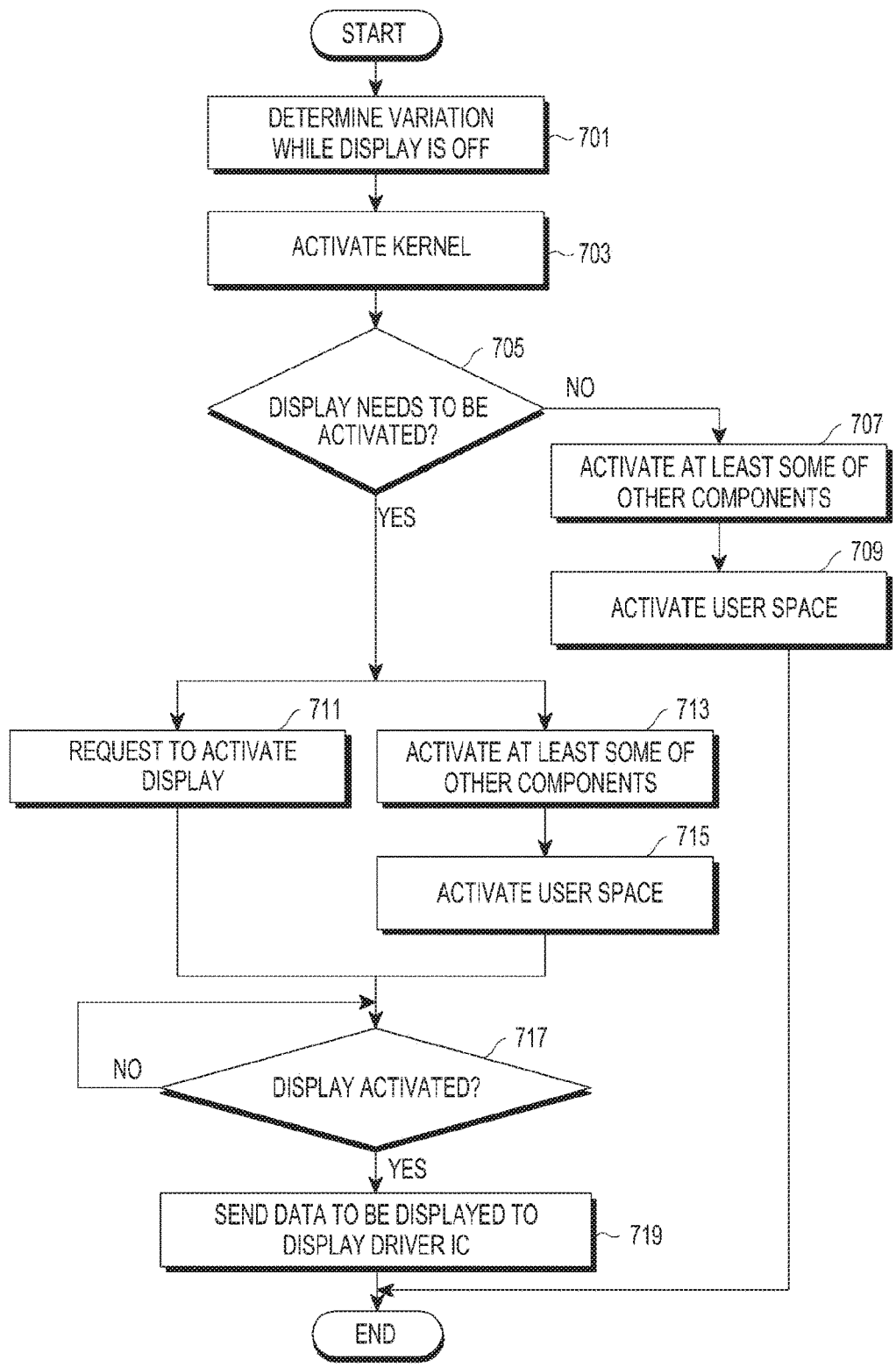
FIG. 7 illustrates a method for providing an image according to an embodiment of the present disclosure.

FIG. 7 illustrates a method for providing an image according to an embodiment of the present disclosure.

Referring to FIG. 7, in step 701, the processor may determine whether there is a variation in the off state of the display.

In step 703, the processor 120 may activate the kernel.

In step 705, the processor 120 may determine whether it is in such a situation where the display 160 needs to be activated.

Examples in which the display 160 needs to be activated may include the occurrence of an identifying operation by at least one sensor in the electronic device 101, the occurrence of an operation of receiving an input by at least one input device, an operation for sending a Bluetooth pairing request from or to an external electronic device, or an operation for receiving a message.

In step 707, upon determining that the display 160 does not need to be activated in the present system, the processor 120 may activate at least some of the other components of the electronic device 101 than the display 160, or alternatively, may activate at least some of the components of the electronic device 160 other than the display 160.

In step 709, the processor 120 may send a request for activating a user space. It has been described above that, for example, the user space may be a storage space for running a user application stored in the memory 150.

Upon determining in step 705 that the display 160 needs to be activated in the present system, the processor 120 in step 713 may activate at least some of the other components of the electronic device 101 than the display 160 simultaneously with step 711.

In step 715, the processor 120 may activate the user space.

In step 717, the processor 120 may determine that the display driver IC is in the activation mode and may determine whether the display 160 is in an activation mode for displaying images based on data while the user space is being activated.

In step 719, upon determining that the display 160 is in the activation mode for displaying images based on data, the processor 120 may transmit data to the display driver IC. For example, when the data is provided from the processor 120 to the display driver IC, the display driver IC may control the display 160 to display the received data through the display 160. Upon determining that the display 160 is not in the activation mode for displaying images based on data, step 717 is repeated.

Figure 8:
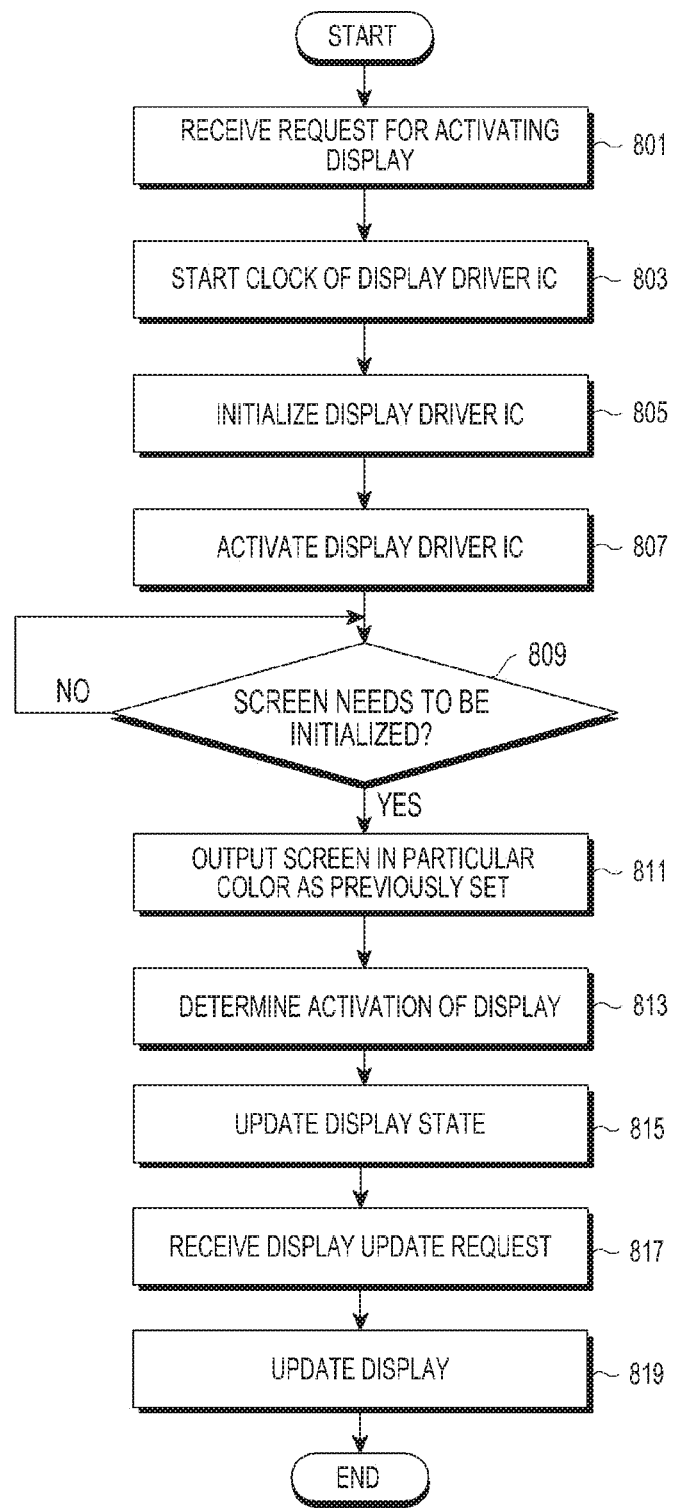
FIG. 8 illustrates a method for providing an image according to an embodiment of the present disclosure.

FIG. 8 illustrates a method for providing an image according to an embodiment of the present disclosure.

Referring to FIG. 8, in step 801, the display driver IC may receive a request for activating the display driver IC from the processor.

In step 803, the display driver IC may initiate a clock.

For example, a command to activate the clock of the display driver IC may include the operation of applying power to the display driver IC.

In step 805, the display driver IC may initialize itself.

For example, an operation for initializing (also referred to as resetting) the display driver IC may be one of procedures for activating the display driver IC.

In step 807, the display driver IC may activate itself.

In step 809, the display driver IC may determine whether initialization of the screen outputted through the display 160 is required.

Examples of the case where the screen outputted through the display 160 is required to be initialized may include when the display 160 outputs error data.

An example of when the screen outputted through the display 160 is required to be initialized may occur when the display driver IC is activated before the display 160 is requested to output image data previously set based on a previously activated user space, and such a situation may arise where an unnecessary screen, rather than the previously set image data based on the user space, may be displayed on the display 160 in the display driver IC.

In step 811, upon determining that the screen outputted through the display 160 is required to be initialized, the display driver IC may perform control so that the error data screen outputted through the display 160 is outputted overall in a preset color.

For example, when determining that the screen outputted through the display 160 is required to be initialized, the display driver IC may perform control so that the error data screen outputted through the display 160 is configured and outputted in black. Upon determining that the screen outputted through the display 160 is not required to be initialized, step 809 is repeated.

In step 813, the display driver IC may determine whether the display is activated.

In step 815, the display driver IC may update the state of the display 160.

For example, the state of the display 160 may include a DPMS of the display 160, the display driver IC may update the DPMS of the display 160, and the display driver IC may update a flag managing the DPMS in order to update the DPMS of the display 160.

In step 817, the display driver IC may receive, from the processor 120, data to be displayed on the display 160 and/or a request for updating the data to be displayed on the display 160.

In step 819, the display driver IC may update the data to be displayed on the display 160.

Figure 9:
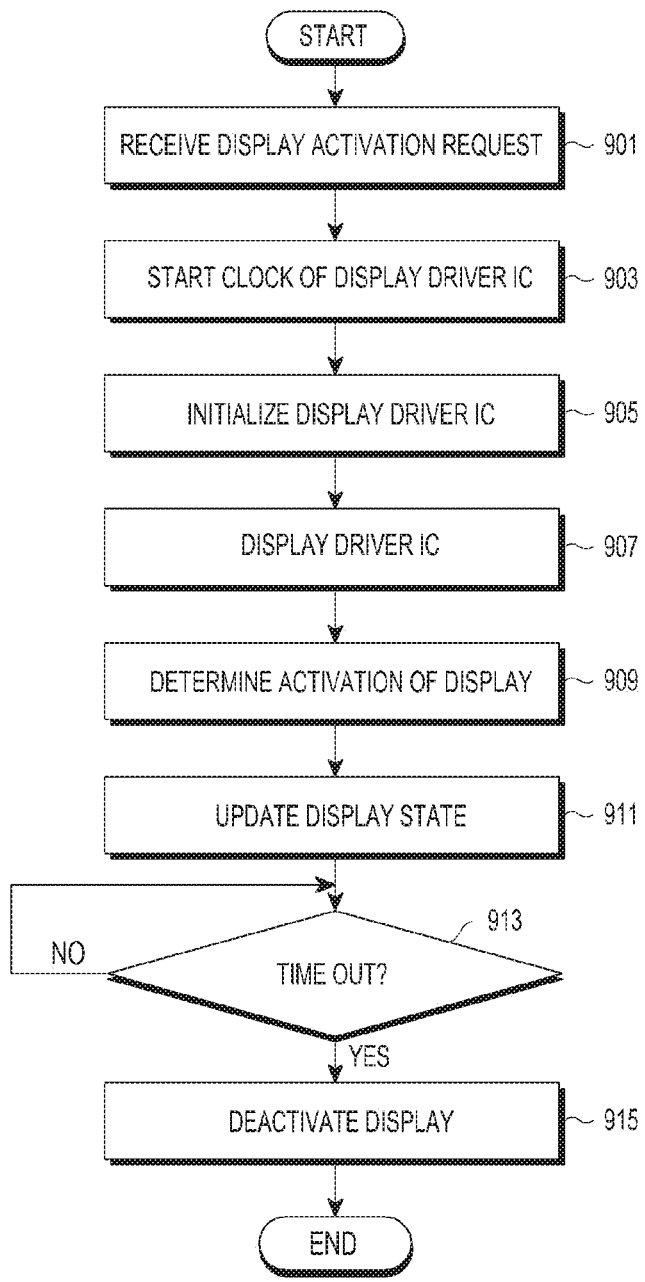
FIG. 9 illustrates a method for providing an image according to an embodiment of the present disclosure.

FIG. 9 illustrates a method for providing an image according to an embodiment of the present disclosure.

Referring to FIG. 9, in step 901, the display driver IC may receive a request for activating the display driver IC from the processor.

In step 903, the display driver IC may initiate a clock. For example, a command to activate the clock of the display driver IC may include the operation of applying power to the display driver IC.

In step 905, the display driver IC may initialize itself. For example, an operation for initializing (e.g., resetting) the display driver IC may be one of procedures for activating the display driver IC.

In step 907, the display driver IC may activate itself.

In step 909, the display driver IC may determine whether the display is activated.

In step 911, the display driver IC may update the state of the display 160. For example, the state of the display 160 may include a DPMS of the display 160, the display driver IC may update the DPMS of the display 160, and the display driver IC may update a flag managing the DPMS in order to update the DPMS of the display 160.

In step 913, the display driver IC may determine whether a time out request is received from the kernel.

For example, the display driver IC may repeatedly determine whether the time out request is received until a time out request is received.

In step 915, when a time out request is received from the kernel, the display driver IC may deactivate the display 160. When a time out request is not received from the kernel, step 913 is repeated.

Although not shown in FIG. 9, the display driver IC may determine whether there is a time out in the display driver IC itself by receiving the time out request from the kernel or even without receiving the time out request from the kernel.

Figure 10:
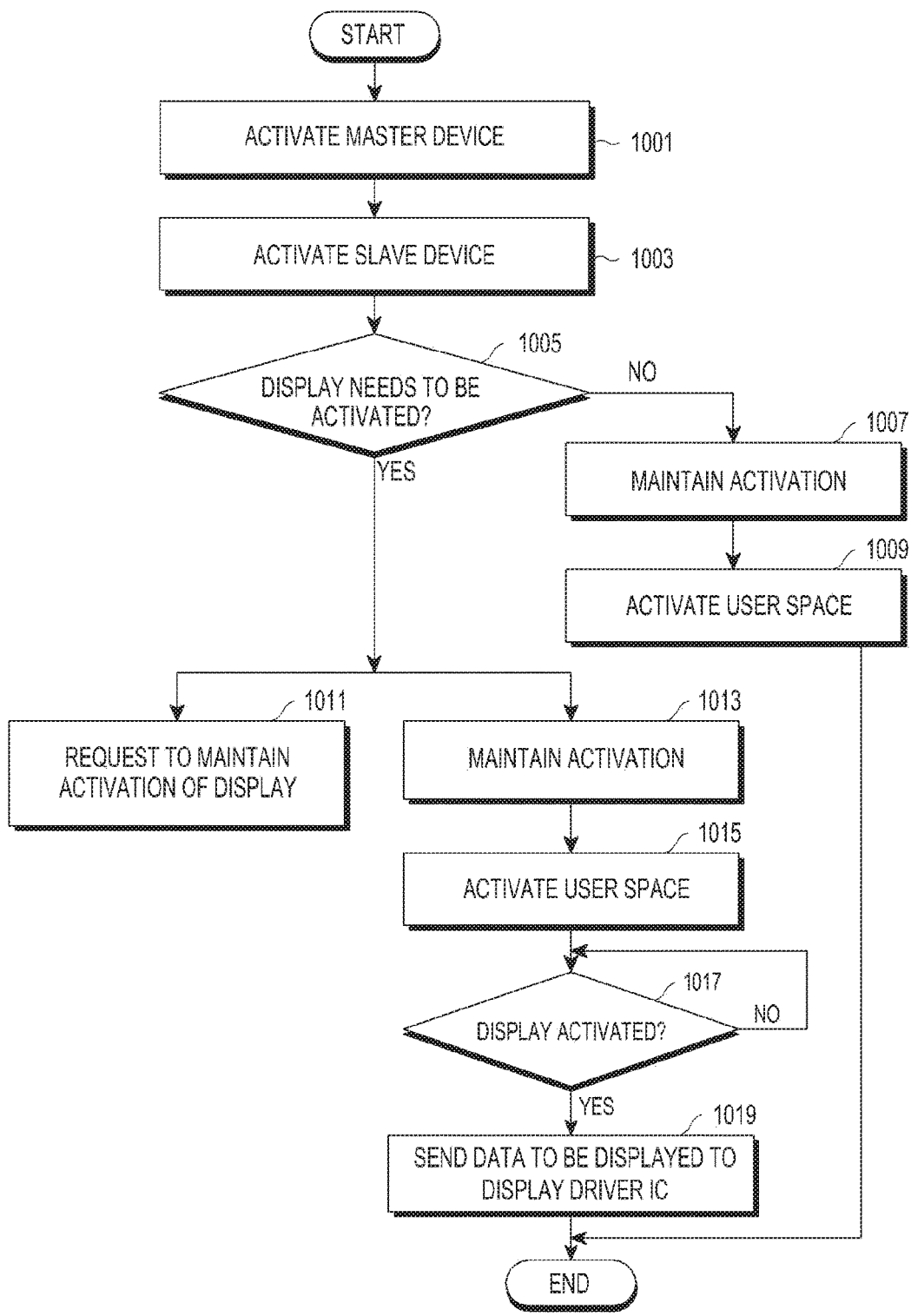
FIG. 10 illustrates a method for providing an image according to an embodiment of the present disclosure.

FIG. 10 illustrates a method for providing an image according to an embodiment of the present disclosure.

Referring to FIG. 10, the method for providing images may apply to an electronic device that cannot perform a procedure for activating the display based on the situation where the display 160 need not be activated.

In step 1001, the processor 120 may activate a master device.

For example, the master device may include a display driver IC and/or memory.

In step 1003, the processor 120 may activate a slave device.

For example, the slave device may include a sensor, key, and/or touch sensor.

Steps 1001 and 1003 of FIG. 10 may be branched from the step of "activating at least some of other components of the electronic device" that has been described above in connection with FIGS. 1 to 9.

In step 1005, the processor 120 may determine whether the display needs to be activated.

In step 1007, for example, upon determining that the display does not need to be activated, the processor 120 may maintain at least some of other components of the electronic device in the activation mode.

In step 1009, the processor 120 may activate the user space.

In step 1019, the processor 120 may transmit data to be displayed through the display 160 to the display driver IC.

In step 1011, upon determining that the display needs to be activated, the processor 120 may transmit a display driver IC activation maintaining request to the display driver IC.

In step 1013, the processor 120 may maintain the activation mode of at least some of other components of the electronic device simultaneously with step 1011.

In step 1015, the processor 120 may maintain the activation mode of the user space.

In step 1017, the processor 120 may determine whether the display 160 is activated as step 1011 is performed.

For example, step 1017 may be repeatedly performed until the display 160 is determined to be activated.

In step 1017, upon determining that the display 160 is not activated, the processor 120 may determine whether the display 160 is activated.

In step 1019, upon determining that the display 160 is activated, the processor 120 may transmit data to be displayed through the display 160 to the display driver IC.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
    a housing;
    a connecting structure connected with a first portion of the housing and configured to be detachably connected with a portion of a user's body;
    a display exposed through a second portion of the housing;
    a display driver integrated circuit (IC) electrically connected with the display;
    a power source;
    a user space integrated into or separated from the display;
    at least one sensor;
    a processor electrically connected with the display, the display driver IC, the power source, the user space, or the at least one sensor; and
    a memory electrically connected with the processor, and storing an operating system including a kernel and instructions,
    wherein the instructions are configured to, when executed, enable the processor to:
    identify a variation, using the user space or the at least one sensor, while the display is off,
    activate the kernel without activating other components of the electronic device in response to the variation,
    determine whether the display needs to be activated,
    after determining that the display needs to be activated, activate the display driver IC,
    after activating the display driver IC, activate the other components of the electronic device,
    after activating the other components, receive data to be displayed on the display,
    after receiving the data, determine whether the display is in an activation mode for displaying an image based on the data, and
    after determining that the display is in the activation mode for displaying the image, provide the data to the display driver IC,
    wherein the memory further stores instructions configured to, when executed, enable the processor to:

determine whether a screen output through the display needs to be initialized, and when it is determined that the screen output through the display needs to be initialized, control the display driver IC to output a screen including a previously set color through the display.

2. The electronic device of claim 1, wherein the memory further stores instructions that when executed, enable the processor to send, to the display driver IC, a request for activating the display driver IC before activating the other components of the electronic device.

3. The electronic device of claim 2, wherein the memory further stores instructions that when executed, enable the processor to, after sending the request for activating the display driver IC before activating the other components of the electronic device, identify whether the display driver IC is activated.

4. The electronic device of claim 1, wherein the memory further stores instructions that when executed, enable the processor to simultaneously activate the display driver IC electrically connected with the display and the other components of the electronic device.

5. The electronic device of claim 1, wherein the data includes first frame data to be displayed on the display.

6. The electronic device of claim 1, wherein the memory further stores instructions that when executed, enable the processor to activate, when it is determined that the display does not need to be activated, the other components of the electronic device without activating the display driver IC.

7. The electronic device of claim 1, wherein the memory further stores instructions that when executed, enable the processor to activate the user space, after activating the other components of the electronic device.

8. The electronic device of claim 1, wherein the memory further stores instructions that when executed, enable the processor to determine, after determining whether the display is in the activation mode for displaying the image based on the data, whether there is a request for activating the display based on the user space for a preset time, and when there is no request for activating the display based on the user space for the preset time, send an off request to the display driver IC.

9. A method for controlling an electronic device, the method comprising:

identifying a variation while a display of the electronic device is off;

activating a kernel without activating other components of the electronic device in response to the variation;

determining whether the display needs to be activated;

activating, after determining that the display needs to be activated, a display driver integrated circuit (IC) electrically connected with the display;

activating, after activating the display driver IC, the other components of the electronic device;

receiving, after activating the other components, data to be displayed on the display;

determining, after receiving the data, whether the display is in an activation mode for displaying an image based on the data; and providing the data to the display driver IC, after determining that the display is in the activation mode for displaying the image, wherein the method further comprises:

determining whether a screen output through the display needs to be initialized; and when it is determined that the screen output through the display needs to be initialized, controlling the display driver IC to output a screen including a previously set color through the display.

10. The method of claim 9, wherein activating the display driver IC electrically connected with the display includes sending, to the display driver IC, a request for activating the display driver IC before activating the other components of the electronic device.

11. The method of claim 10, wherein activating the display driver IC electrically connected with the display includes, after sending the request for activating the display driver IC before activating the other components of the electronic device, identifying whether the display driver IC is activated.

12. The method of claim 9, wherein activating the display driver IC electrically connected with the display is performed simultaneously with activating the other components of the electronic device.

13. The method of claim 9, wherein the data includes first frame data to be displayed on the display.

14. The method of claim 9, further comprising, when it is determined that the display does not need to be activated, activating the other components of the electronic device without activating the display driver IC.

15. The method of claim 14, further comprising, after activating the other components of the electronic device, activating a user space.

16. The method of claim 9, further comprising:

after determining whether the display is in the activation mode for displaying the image based on the data, determining whether there is a request for activating the display based on the user space for a preset time; and when it is determined that there is no request for activating the display based on the user space for the preset time, sending an off request to the display driver IC.

* * * * *